US012639640B2

(12) United States Patent
Ito

(10) Patent No.: US 12,639,640 B2
(45) Date of Patent: May 26, 2026

(54) RESERVATION DEVICE, RESERVATION METHOD, AND RECORDING MEDIUM

(71) Applicant: Rakuten Group, Inc., Tokyo (JP)

(72) Inventor: Takahiro Ito, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/923,796

(22) Filed: Oct. 23, 2024

(65) Prior Publication Data

US 2025/0139538 A1 May 1, 2025

(30) Foreign Application Priority Data

Oct. 31, 2023 (JP) ................................ 2023-186820

(51) Int. Cl.
*G06Q 10/02* (2012.01)
(52) U.S. Cl.
CPC .................................. *G06Q 10/025* (2013.01)
(58) Field of Classification Search
CPC .......................... G06Q 10/025; G06Q 30/0641
See application file for complete search history.

(56) References Cited

U.S. PATENT DOCUMENTS

| | | | | |
|---|---|---|---|---|
| 2002/0116232 A1* | 8/2002 | Rapp | .................... | G06Q 10/109 705/5 |
| 2005/0228677 A1* | 10/2005 | McCabe | ................ | G06Q 10/02 705/5 |
| 2008/0275741 A1* | 11/2008 | Loeffen | .............. | G06Q 30/0601 705/26.1 |

| | | | | |
|---|---|---|---|---|
| 2009/0255153 A1* | 10/2009 | Mori | ........................ | G09D 3/12 40/107 |
| 2010/0198628 A1* | 8/2010 | Rayner | .................. | G06Q 30/02 707/723 |
| 2015/0006223 A1* | 1/2015 | Leslie | ................ | G06Q 10/1097 705/26.62 |

(Continued)

FOREIGN PATENT DOCUMENTS

| | | | |
|---|---|---|---|
| JP | 2019-36342 A | | 3/2019 |
| JP | 2020173527 A | * | 10/2020 |

OTHER PUBLICATIONS

English translation of JP-2020173527-A (Year: 2020).*

(Continued)

*Primary Examiner* — Resha Desai
*Assistant Examiner* — Michael C Moroney
(74) *Attorney, Agent, or Firm* — Sughrue Mion, PLLC

(57) ABSTRACT

A reservation device includes a processor that acquires first date and time information for a first service and second date and time information for a second service. The processor sets selection information based on user input from the first date and time information. In a case in which the second service is to be simultaneously reserved after setting the selection information, the processor extracts simultaneously reservable dates and times based on both the first and second date and time information. The extraction is performed based on either a service period of one of the services or an empty period defined between services. In a case in which a selection is made from the extracted simultaneously reservable dates and times, the processor updates the selection information accordingly and performs the reservation based on the updated information.

6 Claims, 12 Drawing Sheets

(56) References Cited

U.S. PATENT DOCUMENTS

| | | | | |
|---|---|---|---|---|
| 2016/0253048 | A1* | 9/2016 | Silcock | G06F 3/04842 |
| | | | | 715/753 |
| 2017/0032329 | A1* | 2/2017 | Keller | H04L 67/52 |
| 2017/0154315 | A1* | 6/2017 | Garg | G06Q 10/1093 |
| 2017/0344912 | A1* | 11/2017 | Magnay | G06Q 10/025 |
| 2021/0287281 | A1* | 9/2021 | Arner | G06F 9/547 |
| 2023/0068122 | A1* | 3/2023 | Gonzalez | G06F 3/0481 |
| 2023/0135380 | A1* | 5/2023 | Kumar | G06Q 10/063112 |
| | | | | 705/7.19 |
| 2024/0070562 | A1* | 2/2024 | Nihira | G06Q 10/025 |

OTHER PUBLICATIONS

Booknetic; "Multi-booking feature"; Accessed as of Aug. 14, 2023; Booknetic; pp. 1-6; https://www.booknetic.com/feature/multi-booking-feature (Year: 2023).*

* cited by examiner

| SERVER |
|---|

400

100

| INFORMATION TERMINAL |
|---|

100

| INFORMATION TERMINAL |
|---|

INFORMATION TERMINAL

INFORMATION TERMINAL

VEHICLE INSPECTION RESERVATION PAGE

SELECT DESIRED DATE AND TIME

| PREVIOUS WEEK ← | OCT. 4, 2023 | | | | | | | NEXT WEEK → |
| | 2 MON | 3 TUE | 4 WED | 5 THUR | 6 FRI | 7 SAT | 8 SUN | |
|---|---|---|---|---|---|---|---|---|
| 10:00 | ◯ | × | × | × | ◯ | ◯ | × | 10:00 |
| 10:30 | ◯ | ◯ | × | ◯ | × | × | ◯ | 10:30 |
| 11:00 | × | ◯ | ◯ | ◯ | ◯ | ◯ | ◯ | 11:00 |
| 11:30 | × | ◯ | × | ◯ | ◯ | × | ◯ | 11:30 |
| 12:00 | × | ◯ | ◯ | ◯ | ◯ | × | × | 12:00 |
| 12:30 | ◯ | × | ◯ | ◯ | ◯ | × | × | 12:30 |
| 13:00 | ◯ | × | × | ◯ | ◯ | × | × | 13:00 |
| 13:30 | ◯ | ◯ | ◯ | ◯ | ◯ | ◯ | ◯ | 13:30 |
| 14:00 | ◯ | ◯ | ◯ | ◯ | ◯ | × | ◯ | 14:00 |
| 14:30 | × | ◯ | ◯ | ◯ | ◯ | × | ◯ | 14:30 |
| 15:00 | × | ◯ | ⊘ | ◯ | × | × | ◯ | 15:00 |
| 15:30 | ◯ | ◯ | × | | × | ◯ | ◯ | 15:30 |
| 16:00 | ◯ | × | × | ◯ | × | × | ◯ | 16:00 |
| 16:30 | × | × | × | ◯ | ◯ | ◯ | × | 16:30 |
| 17:00 | ◯ | × | × | ◯ | ◯ | × | × | 17:00 |
| 17:30 | × | × | ◯ | ◯ | × | × | × | 17:30 |

INFORMATION TERMINAL

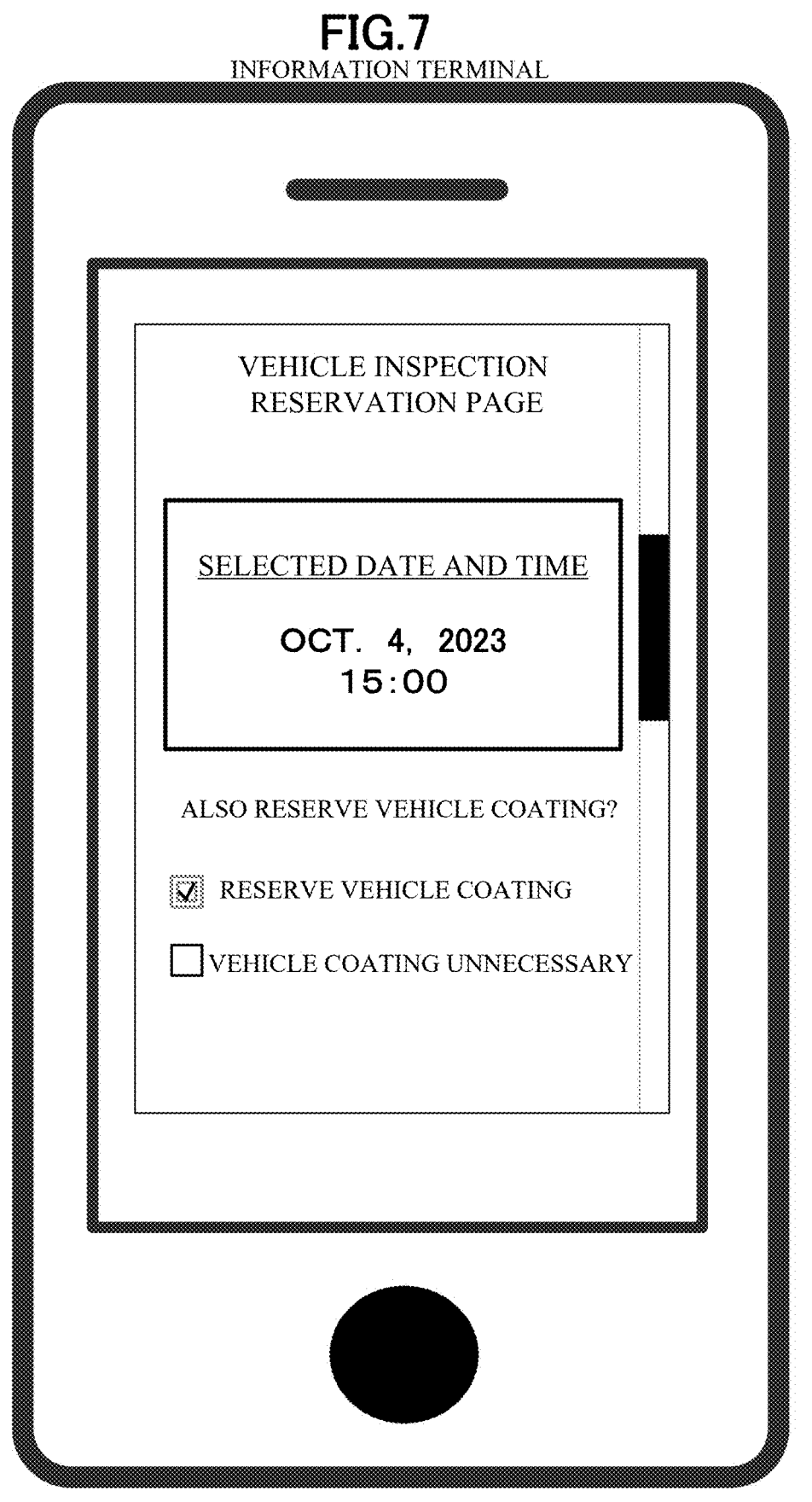

FIG.7
INFORMATION TERMINAL

VEHICLE INSPECTION
RESERVATION PAGE

SELECTED DATE AND TIME

OCT. 4, 2023
15:00

ALSO RESERVE VEHICLE COATING?

☑ RESERVE VEHICLE COATING

☐ VEHICLE COATING UNNECESSARY

INFORMATION TERMINAL

INFORMATION TERMINAL

INFORMATION TERMINAL

INFORMATION TERMINAL

INFORMATION TERMINAL

RESERVATION DEVICE, RESERVATION METHOD, AND RECORDING MEDIUM

CROSS-REFERENCE TO RELATED APPLICATIONS

This application claims the benefit of Japanese Patent Application No. 2023-186820, filed on Oct. 31, 2023, the entire disclosure of which is incorporated by reference herein.

FIELD OF THE INVENTION

This application relates generally to a reservation device, a reservation method, and a recording medium.

BACKGROUND OF THE INVENTION

Systems have been proposed that are capable of performing reservations of various services and facilities over the internet. For example, Unexamined Japanese Patent Application Publication No. 2019-36342 describes a reservation system capable of simultaneously performing a reservation of a sporting facility and a service associated with that facility.

SUMMARY OF THE INVENTION

However, the system described above is still lacking from the perspective of performing simultaneous reservations in a preferable manner.

The present disclosure is made with the view of the above situation, and an objective of the present disclosure is to provide a reservation device, a reservation method, and a recording medium capable of performing simultaneous reservations in a preferable manner.

A reservation device according to a first aspect of the present disclosure includes:

one or more processors, wherein the one or more processors execute processing for acquiring first date and time information expressing a reservable date and time for a first service, and a second date and time expressing a reservable date and time for a second service, setting selection information including information selected based on the first date and time information, in a case in which, after setting the selection information, the second service is to be simultaneously reserved, extracting a simultaneously reservable date and time which is a date and time that is simultaneously reservable and which is based on the first date and time information and the second date and time information, in a case in which selected based on the extracted simultaneously reservable date and time, updating, based on the selection, the selection information, performing, based on the selection information, a reservation of a service, and extracting, based on a service period of one of the first service and the second service or an empty period defined between the first service and the second service, the simultaneously reservable date and time.

According to the present disclosure, it is possible to provide a reservation device, a reservation method, and a recording medium capable of performing simultaneous reservations in a preferable manner.

BRIEF DESCRIPTION OF DRAWINGS

A more complete understanding of this application can be obtained when the following detailed description is considered in conjunction with the following drawings, in which:

FIG. 1 is a drawing illustrating the relationship between an information terminal and a server;

FIG. 7 is an explanatory drawing illustrating a display example of the information terminal;

DETAILED DESCRIPTION OF THE INVENTION

Overall Configuration

Figure 2:
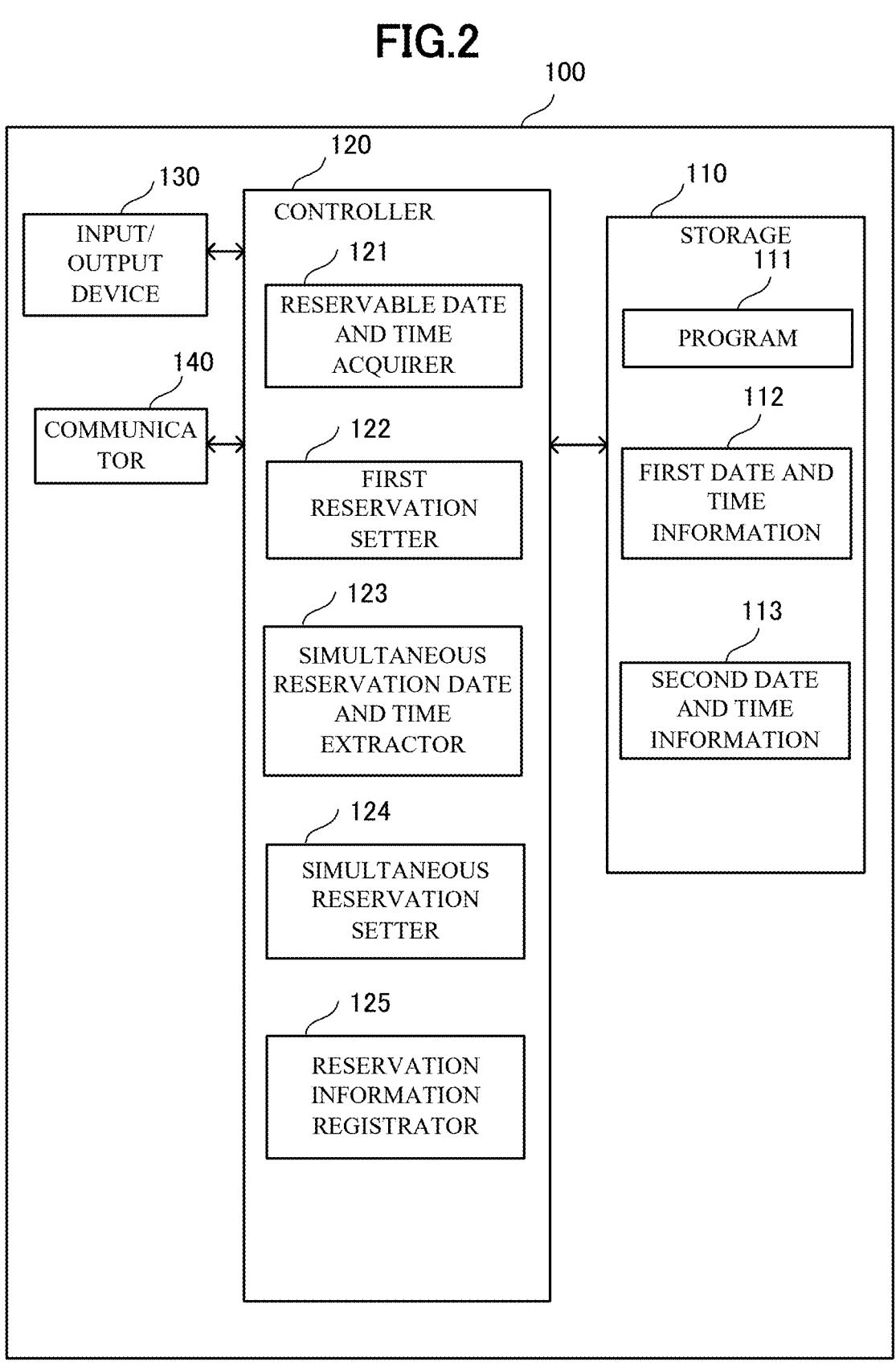
FIG. 2 is a block diagram illustrating an example of an information terminal.

A reservation device, a reservation method, and a non-transitory recording medium according to various embodiments of the present disclosure are described in detail while referencing the drawings. Note that, in the drawings, identical or corresponding components are denoted with the same reference numerals. As illustrated in FIG. 1, an information terminal 100 according to some embodiments of the present disclosure is communicably connected to a server 200 across a computer communication network 400 such as the internet or the like. Note that, in this embodiment, the information terminal 100 corresponds to a reservation device. Additionally, in this embodiment, an example is described in which a user simultaneously reserves a vehicle coating service when reserving a vehicle inspection. However, the present disclosure is not limited to vehicle inspections and can be applied when simultaneously reserving other services such as, for example, reserving a manicure or a massage simultaneously when reserving a haircut at a beauty salon. Here, the term "simultaneous reservation" means sequentially setting reservations for a plurality of services together.

In one example, the information terminal 100 is implemented as an information terminal (a so-called computer) such as a smartphone, a tablet, or a personal computer (PC) owned by the user, and is capable of bidirectional communication with the server 200 over the computer communication network 400. Specifically, the information terminal 100 is a terminal that acquires, from the server 200, reservable dates and times for a vehicle inspection and/or a vehicle coating, and performs a reservation for the vehicle inspection and/or vehicle coating on the basis of operations by the user.

The server 200 includes a function for providing, to the information terminal 100 in response to a request from the information terminal 100, first date and time information 112 expressing reservable dates and times for the vehicle inspection and second date and time information 113 expressing reservable dates and times for the vehicle coating; a function for performing a reservation of the vehicle inspection and/or the vehicle coating on the basis of content of reservation information received from the information terminal 100; and a function for providing reservation results to the information terminal 100.

Functional Configuration of Information Terminal

Next, the configuration of information terminal 100 is described while referencing FIG. 2. The information terminal 100 is an information terminal such as a smartphone, a tablet, a PC, or the like.

As illustrated in FIG. 2, the information terminal 100 includes a storage 110, a controller 120, an input/output device 130, a communicator 140, and a system bus (not illustrated in the drawing) that connects these components to each other.

The storage 110 is realized by a read-only memory (ROM), a random access memory (RAM), a hard disk drive (HDD), and the like. The storage 110 stores a program 111 executed by a central processing unit (CPU) of the controller 120, various types of data (not illustrated in the drawing) required in advance to execute the program 111, the first date and time information 112, and the second date and time information 113.

The program 111 is a program for executing the hereinafter described reservation processing, and is stored in advance in the storage 110.

The first date and time information 112 is information that expresses reservable dates and times for the vehicle inspection. The first date and time information 112 is acquired from the server 200 at a timing at which an application for performing the reservation of the vehicle inspection is started up. The first date and time information 112 is stored in the storage 110.

The second date and time information 113 is information that expresses reservable dates and times for the vehicle coating. As with the first date and time information 112, the second date and time information 113 is acquired from the server 200 at the timing at which the application for performing the reservation of the vehicle inspection is started up. The second date and time information 113 is stored in the storage 110.

The controller 120 includes the CPU, an application specific integrated circuit (ASIC), and the like. The controller 120 operates in accordance with the program 111 stored in the storage 110, and executes processings according to the program 111. The controller 120 includes, as main functional components provided by the program 111 stored in the storage 110, a reservable date and time acquirer 121, a first reservation setter 122, a simultaneous reservation date and time extractor 123, a simultaneous reservation setter 124, and a reservation information registrator 125.

The reservable date and time acquirer 121 is a functional component that acquires the first date and time information 112 and the second date and time information 113 from the server 200. Specifically, the reservable date and time acquirer 121 sends, on the basis of the application for reserving the vehicle inspection being started up, a first date and time information and second date and time information request, that is a request for sending the first date and time information 112 and the second date and time information 113, to the server 200, and acquires the first date and time information 112 and the second date and time information 113 from the server 200. Note that the acquired first date and time information 112 and second date and time information 113 are stored in the storage 110.

The first reservation setter 122 is a functional component that sets, as a vehicle inspection reservation date and time, a date and time selected by the user. Specifically, the first reservation setter 122 sets the vehicle inspection reservation date and time by storing, in the storage 110 and as the reservation date and time of the vehicle inspection, a date and time selected by the user from among the first date and time information 112 displayed on the input/output device 130.

The simultaneous reservation date and time extractor 123 is a functional component that has a function for selectably displaying the presence/absence of a simultaneous reservation of the vehicle inspection and the vehicle coating, and a function for, when the user selects to perform the simultaneous reservation, extracting and displaying, on the input/output device 130, simultaneously reservable dates and times. Specifically, the simultaneous reservation date and time extractor 123 has a function for displaying, on the input/output device 130, a display allowing the user to select whether to perform a simultaneous reservation of the vehicle inspection and the vehicle coating; and a function for, when the user selects to perform the simultaneous reservation, extracting, from the first date and time information 112 and the second date and time information 113, and displaying, on the input/output device 130, reservable dates and times for both the vehicle inspection and the vehicle coating. For example, in a case in which, in the first date and time information 112, three time slots, namely 14:00, 14:30, and 15:00 on October 4 are displayed as reservable dates and times for the vehicle inspection and, in the second date and time information 113, two time slots, namely, 16:00 and 16:30 on October 4 are displayed as reservable dates and times for the vehicle coating, the simultaneous reservation date and time extractor 123 extracts 14:00 and 14:30 on October 4 as the simultaneously reservable dates and times. Note that, in this example, a case is described in which the vehicle coating is performed after the vehicle inspection, and it is assumed that two hours are required for the vehicle inspection. However, the simultaneously reservable dates and times may be extracted such that the vehicle coating is performed first and, then, the vehicle inspection is performed. Additionally, the vehicle inspection and the vehicle coating need not be performed consecutively and, for example, a simultaneous reservation is possible in which the vehicle inspection is performed in the morning and the vehicle coating is performed in the afternoon.

Furthermore, the simultaneous reservation date and time extractor 123 displays dates and times, among the dates and times that the vehicle inspection was reservable, that have changed to a simultaneous reservation impossible date and time in a mode whereby the user can visually recognize that the change has occurred. For example, in a case in which, as described above, the three time slots, namely 14:00, 14:30, and 15:00 on October 4 are displayed as reservable dates and times for the vehicle inspection and, in the second date and time information 113, two time slots, namely, 16:00 and 16:30 on October 4 are displayed as reservable dates and times for the vehicle coating, 14:00 and 14:30 on October 4 are simultaneously reservable dates and times and, as such, 15:00 changes to a simultaneous reservation impossible date and time. Then, the simultaneous reservation date and time extractor 123 displays the 15:00 in a noticeable mode so that the user can recognize that the change has occurred. As a result, the user can easily visually recognize which dates and times have changed to simultaneous reservation impossible dates and times, and confusion of the user can be prevented.

The simultaneous reservation setter 124 is a functional component that sets, as a simultaneous reservation date and time, a date and time selected by the user from among the simultaneously reservable dates and times displayed by the simultaneous reservation date and time extractor 123. Specifically, the simultaneous reservation setter 124 sets the simultaneous reservation date and time by storing the dates and times selected by the user from among the simultaneously reservable dates and times displayed by the input/output device 130 in the storage 110 as reservation dates and times for both the vehicle inspection and the vehicle coating.

The reservation information registrator 125 is a functional component that sends, to the server 200, the vehicle inspection reservation date and time set by the first reservation setter 122 and the simultaneous reservation date and time set by the simultaneous reservation setter 124, and registers the reservations of the services desired by the user in the server 200 to complete the reservations. Specifically, when not performing a simultaneous reservation, that is, when performing a reservation of only the vehicle inspection, the reservation information registrator 125 sends, to the server 200 as the reservation information, the vehicle inspection reservation date and time set by the first reservation setter 122; and, when performing a simultaneous reservation, sends, to the server 200 as the reservation information, the simultaneous reservation date and time set by the simultaneous reservation setter 124. Note that the reservation information includes specification information for specifying whether the reservation is for only the vehicle inspection or the reservation is a simultaneous reservation for the vehicle inspection and the vehicle coating.

The input/output device 130 is a device that includes a keyboard, a mouse, a camera, a microphone, a liquid crystal display, an organic electro luminescence (EL) display, or the like, and is for inputting and outputting of various types of data. The display may be a touch panel display.

The communicator 140 is a device that the information terminal 100 uses to perform communication across the computer communication network 400 with other information terminals such as the server 200 or the like. The configuration of the information terminal 100 is as described above.

Operations

Figure 3:
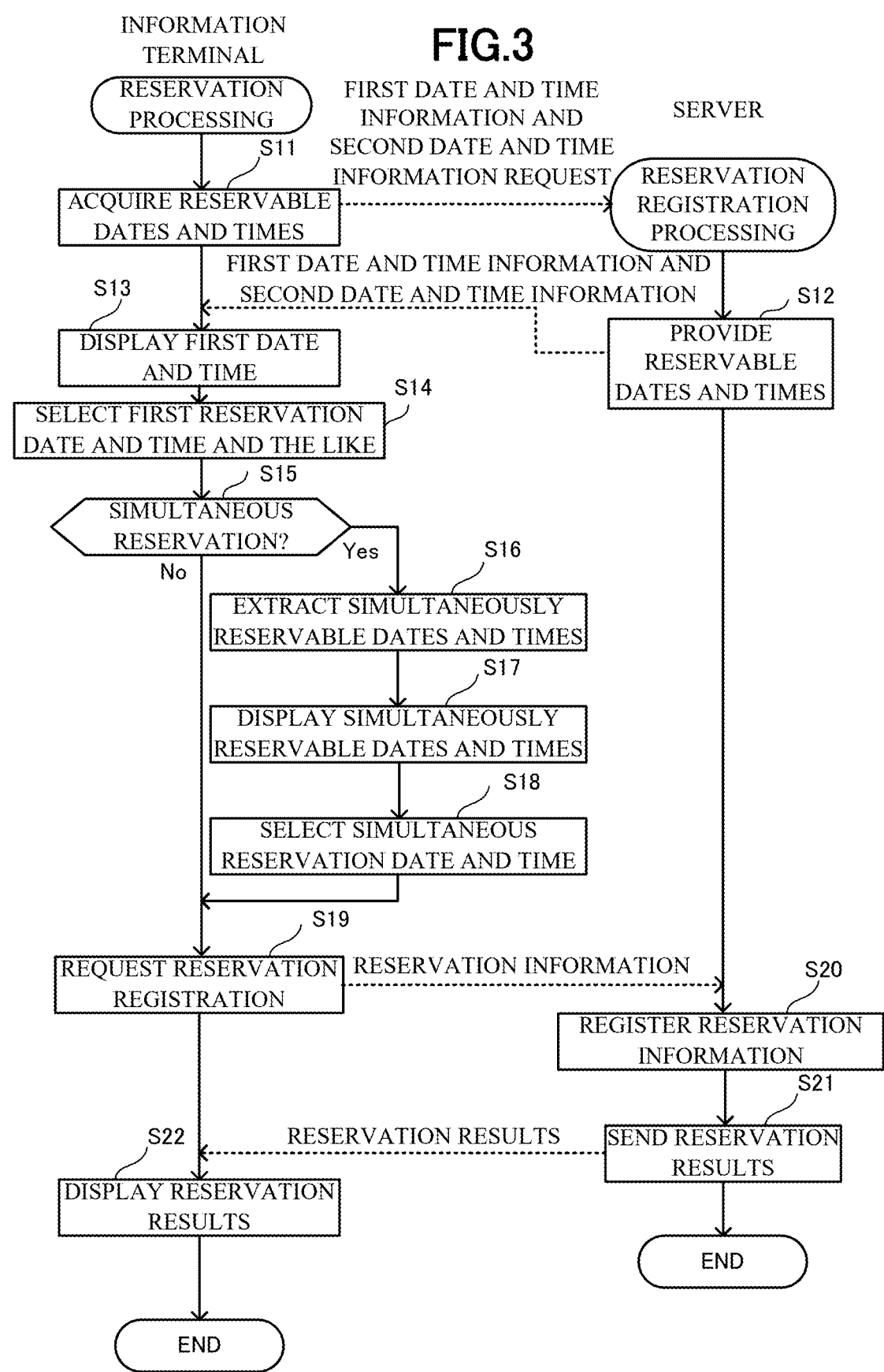
FIG. 3 is a flowchart illustrating an example of the processing of the entire system.

Next, the operations of the information terminal 100 and the server 200 are described while referencing FIGS. 3 to 9. FIG. 3 is a flowchart illustrating an example of the processing of the entire system, including reservation processing of the information terminal 100 and reservation registration processing of the server 200. Note that, in this embodiment, an example is described of a case in which the vehicle coating is simultaneously reserved when reserving the vehicle inspection. However, the present disclosure is not limited to the vehicle inspection and can be applied to a case of simultaneously reserving a manicure or a massage when reserving a haircut at a beauty salon. In addition, the present disclosure can be applied to a case of simultaneously reserving a plurality of services.

Firstly, the reservation processing illustrated in FIG. 3 is started when the user performs an operation on the information terminal 100. Specifically, the reservation processing is started as a result of the user performing, on the information terminal 100, an operation for starting up a vehicle inspection reservation application. When the reservation processing starts, the information terminal 100 sends the first date and time information and second date and time information request to the server 200, and acquires the reservable dates and times (step S11). Specifically, in the processing of step S11, the controller 120 uses the function of the reservable date and time acquirer 121 to send, to the server 200, the first date and time information and second date and time information request for requesting sending of the first date and time information 112 that expresses the reservable dates and times for the vehicle inspection and the second date and time information 113 that expresses the reservable dates and times for the vehicle coating, and acquires the first date and time information 112 and the second date and time information 113 from the server 200 to acquire the reservable dates and times. The information terminal 100 stores the acquired first date and time information 112 and second date and time information 113 in the storage 110.

On the server 200 side, when the first date and time information and second date and time information request is received from the information terminal 100, the reservable dates and times for the vehicle inspection are extracted as the first date and time information 112 and the reservable dates and times for the vehicle coating are extracted as the second date and time information 113, and the first date and time information 112 and the second date and time information 113 are sent to the information terminal 100 to provide the reservable dates and times to the information terminal 100 (step S12). Specifically, in the processing of step S12, the server 200 confirms a reservation status of the vehicle inspection and a reservation status of the vehicle coating at the timing at which the first date and time information and second date and time information request is received from the information terminal 100 against respective reservation status information stored in the storage 110, and extracts and sends, to the information terminal 100, the reservable dates and times of the vehicle inspection and the reservable dates and times of the vehicle coating as the first date and time information 112 and the second date and time information 113, respectively. Thus, the server 200 provides the reservable dates and times to the information terminal 100. Due to the processing of step S12 being performed, the information terminal 100 acquires the first date and time information 112 and the second date and time information 113.

Figure 4:
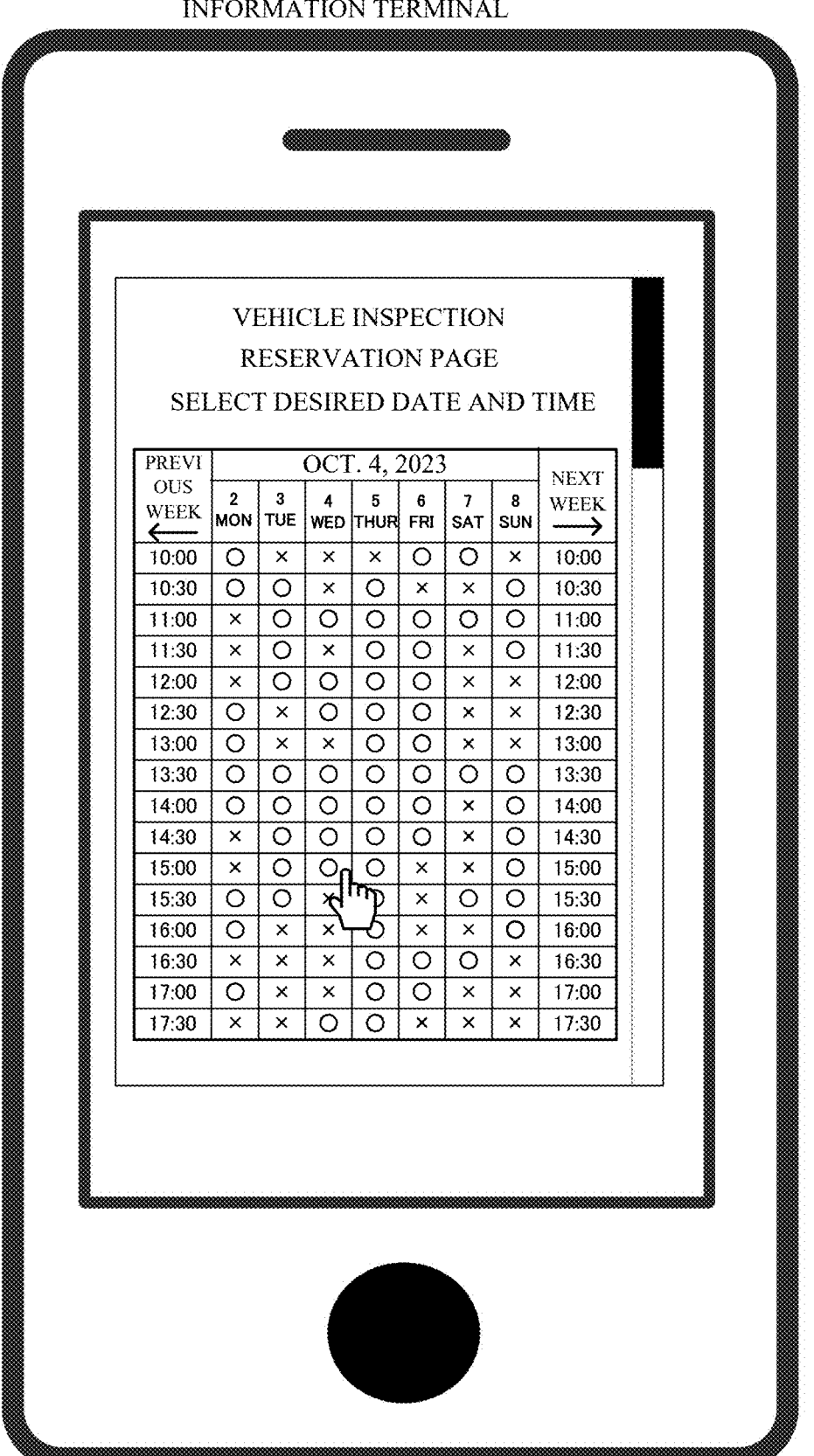
FIG. 4 is an explanatory drawing illustrating a display example of the information terminal.

The information terminal 100 that has acquired the first date and time information 112 and the second date and time information 113 displays, on the basis of the first date and time information 112, first dates and times expressing dates and times that the vehicle inspection can be reserved (step S13). Specifically, in the processing of step S13, as illustrated in FIG. 4, for example, the controller 120 displays, on the input/output device 130, the first dates and times expressing dates and times that the vehicle inspection can be reserved. As a result, the user can reserve the vehicle inspection. Note that, an example is described in which displaying of dates and times that are not reservable for the vehicle inspection is included in the first dates and times displayed in step S13, but a configuration is possible in which only the reservable dates and times are displayed.

Figure 5:
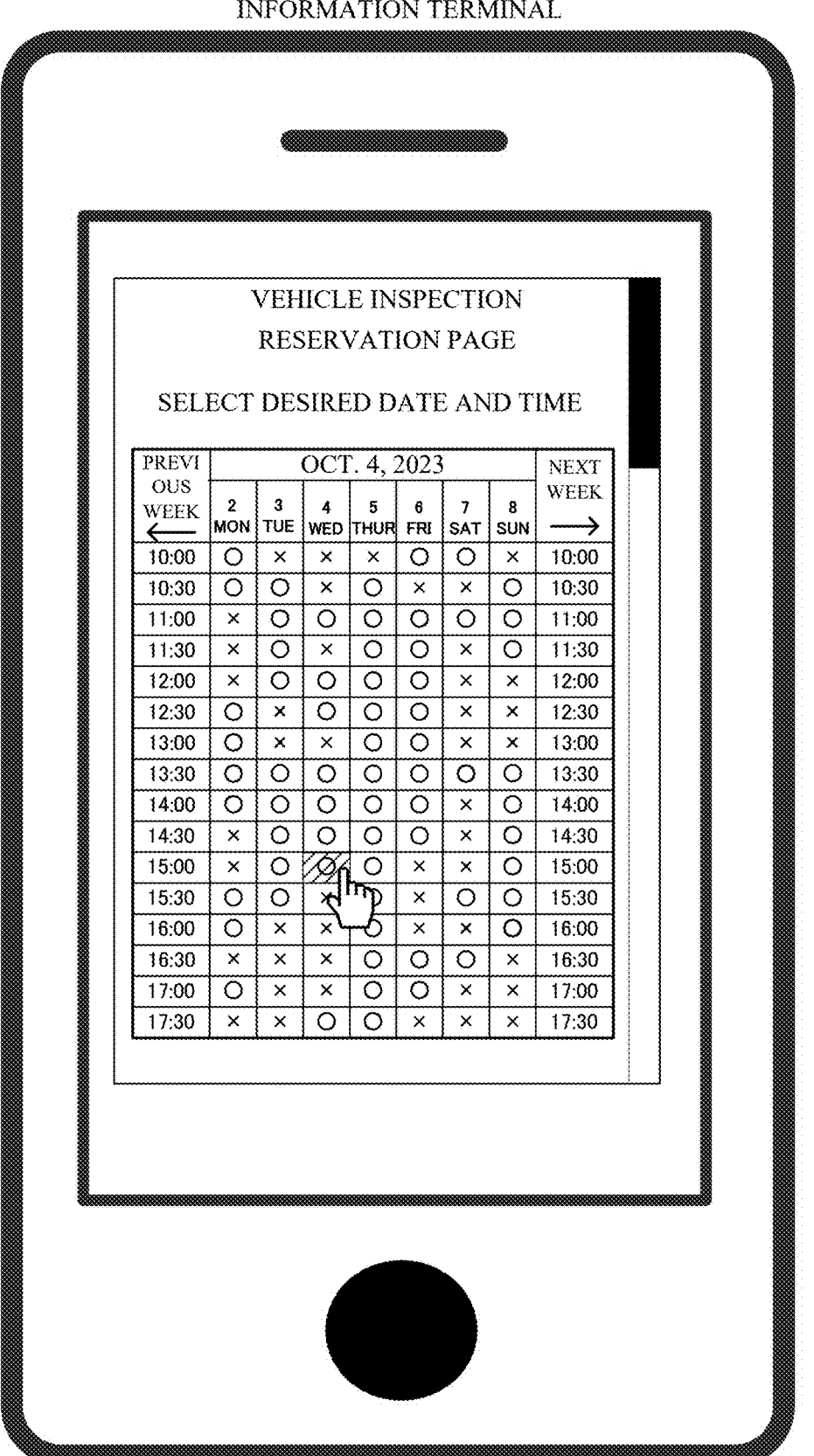
FIG. 5 is an explanatory drawing illustrating a display example of the information terminal.
Figure 6:
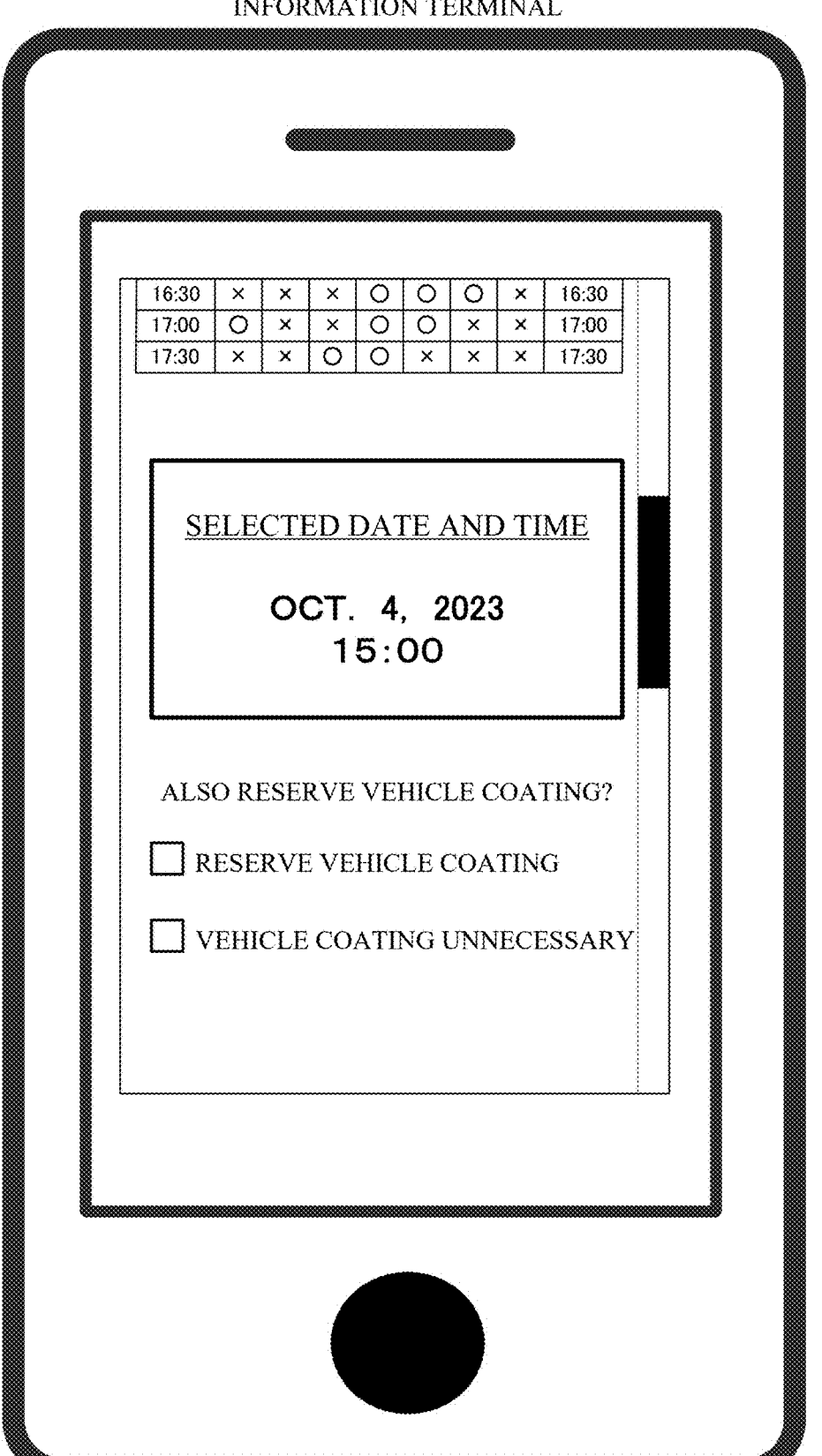
FIG. 6 is an explanatory drawing illustrating a display example of the information terminal.

Returning to FIG. 3, after executing the processing of step S13, in the information terminal 100, selection of a first reservation date and time and the like is performed on the basis of operations by the user (step S14). Specifically, in the processing of step S14, the user performs an operation on the input/output device 130 and, as illustrated in FIG. 5, a desired date and time for the vehicle inspection is selected and, as illustrated in FIGS. 6 and 7, whether to perform a simultaneous reservation of the vehicle inspection and the vehicle coating (in the illustrated example, the displaying of "Also reserve vehicle coating" and "Vehicle coating unnecessary") is selected by an operation of the illustrated check boxes. Note that it is sufficient that the selectable displaying of whether to perform the simultaneous reservation of the vehicle inspection and the vehicle coating (in the illustrated example, the displaying of "Also reserve vehicle coating" and "Vehicle coating unnecessary") is performed by the functions of the simultaneous reservation date and time extractor 123. Additionally, the vehicle inspection reservation date and time (the first reservation date and time) and the presence/absence of the simultaneous reservation selected in the processing of step S14 are stored as selection information in the storage 110 by the functions of the first reservation setter 122. In the example illustrated in FIG. 5, 15:00 on Oct. 4, 2023 is selected as the vehicle inspection reservation date and time. When the reservation date and time is selected, as illustrated in the drawings, the selected date and time is displayed in a visually recognizable manner. Then, in the example illustrated in FIG. 7, a selection is made to perform the simultaneous reservation. In this case, these pieces of information are stored in the storage 110 as the selection information. Specifically, the vehicle inspection reservation date and time and the presence/absence of the simultaneous reservation are stored as the selection information.

When, in the processing of step S14 illustrated in FIG. 3, a vehicle inspection reservation desired date and time is selected as the first reservation date and time and, also, whether to perform the simultaneous reservation of the vehicle inspection and the vehicle coating is selected, the controller 120 determines, by the functions of the simultaneous reservation date and time extractor 123, whether a selection for performing the simultaneous reservation of the vehicle inspection and the vehicle coating has been performed (step S15). Specifically, in the processing of step S15, the simultaneous reservation date and time extractor 123 determines, by confirming the selection information stored in the storage 110, whether to perform the simultaneous reservation of the vehicle inspection and the vehicle coating is selected in the processing of step S14.

When, in the processing of step S15, a determination is made that the simultaneous reservation is selected (step S15; Yes), the controller 120 extracts the simultaneously reservable dates and times by the functions of the simultaneous reservation date and time extractor 123 (step S16). Specifically, in the processing of step S16, the simultaneous reservation date and time extractor 123 extracts, from the first date and time information 112 and the second date and time information 113, dates and times when both the vehicle inspection and the vehicle coating can be reserved.

Figure 8:
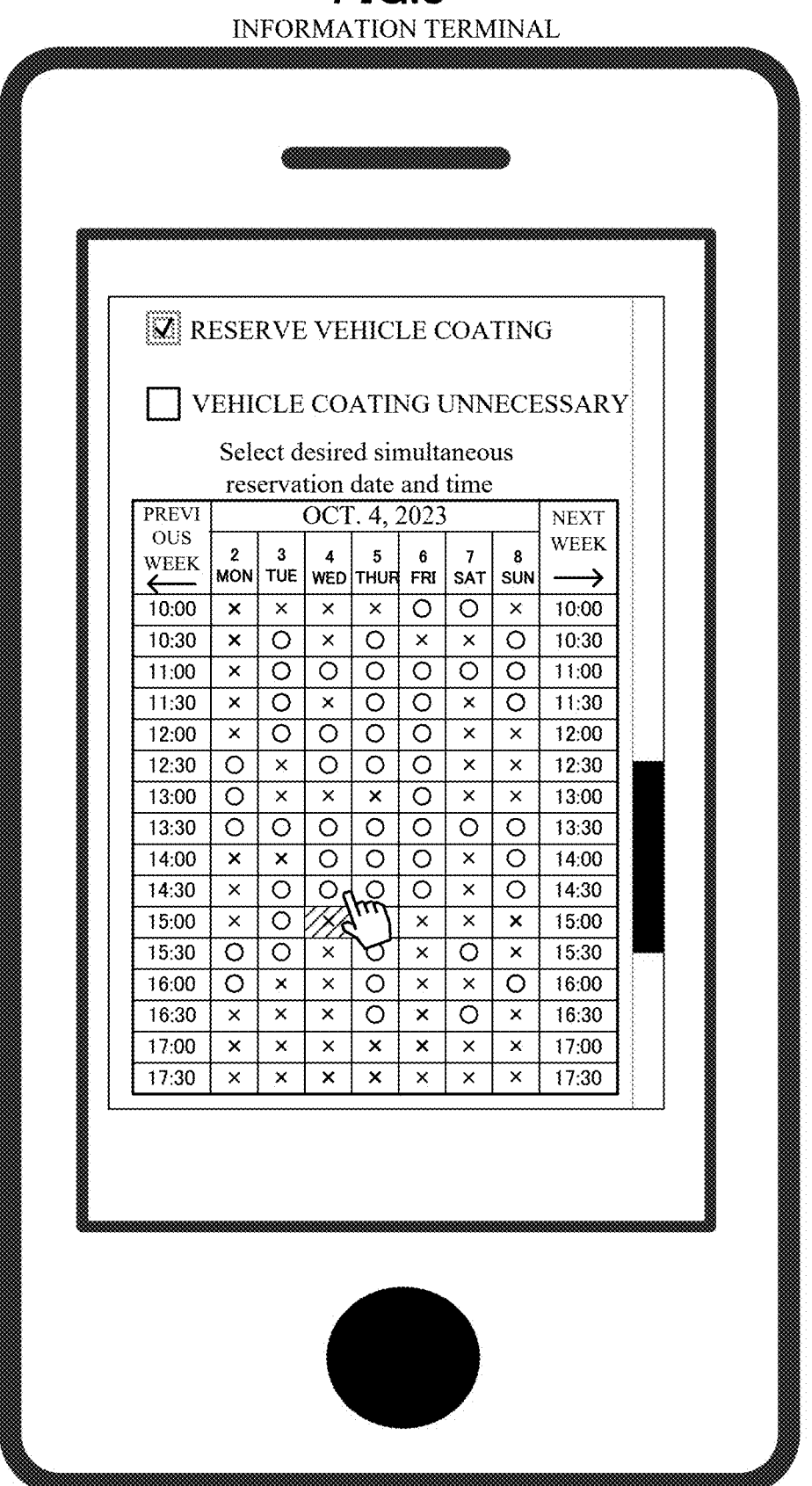
FIG. 8 is an explanatory drawing illustrating a display example of the information terminal.

After the processing of step S16 is executed, the controller 120 displays, by the functions of the simultaneous reservation date and time extractor 123, the simultaneously reservable dates and times extracted in the processing of step S16 on the input/output device 130 (step S17). Specifically, in the processing of step S17, as illustrated in FIG. 8, the simultaneous reservation date and time extractor 123 displays the extracted simultaneously reservable dates and times using the symbol "O", and displays the dates and times, among the dates and times that the vehicle inspection was reservable, that changed to simultaneous reservation impossible dates and times using the bold symbol "X", thereby displaying in a mode whereby the user can visually recognize that a change has occurred. Note that, in the illustrated example, the dates and times, among the dates and times that the vehicle inspection was reservable, that changed to simultaneous reservation impossible dates and times are displayed using the bold symbol "X", but this is merely an example and any desired mode may be used provided that the user can visually recognize that a change has occurred. Examples thereof include darkening the background and the like. In the illustrated example, the slot for 15:00 on October 4 (Wed), on which the vehicle inspection was reservable, has changed to a simultaneous reservation impossible date and time. As illustrated in the drawing, the background of the date and time selected as the vehicle inspection reservation date and time is displayed in a different color. That is, the selected date and time can be made more obvious by displaying the selected date and time in an identifiable mode.

Figure 9:
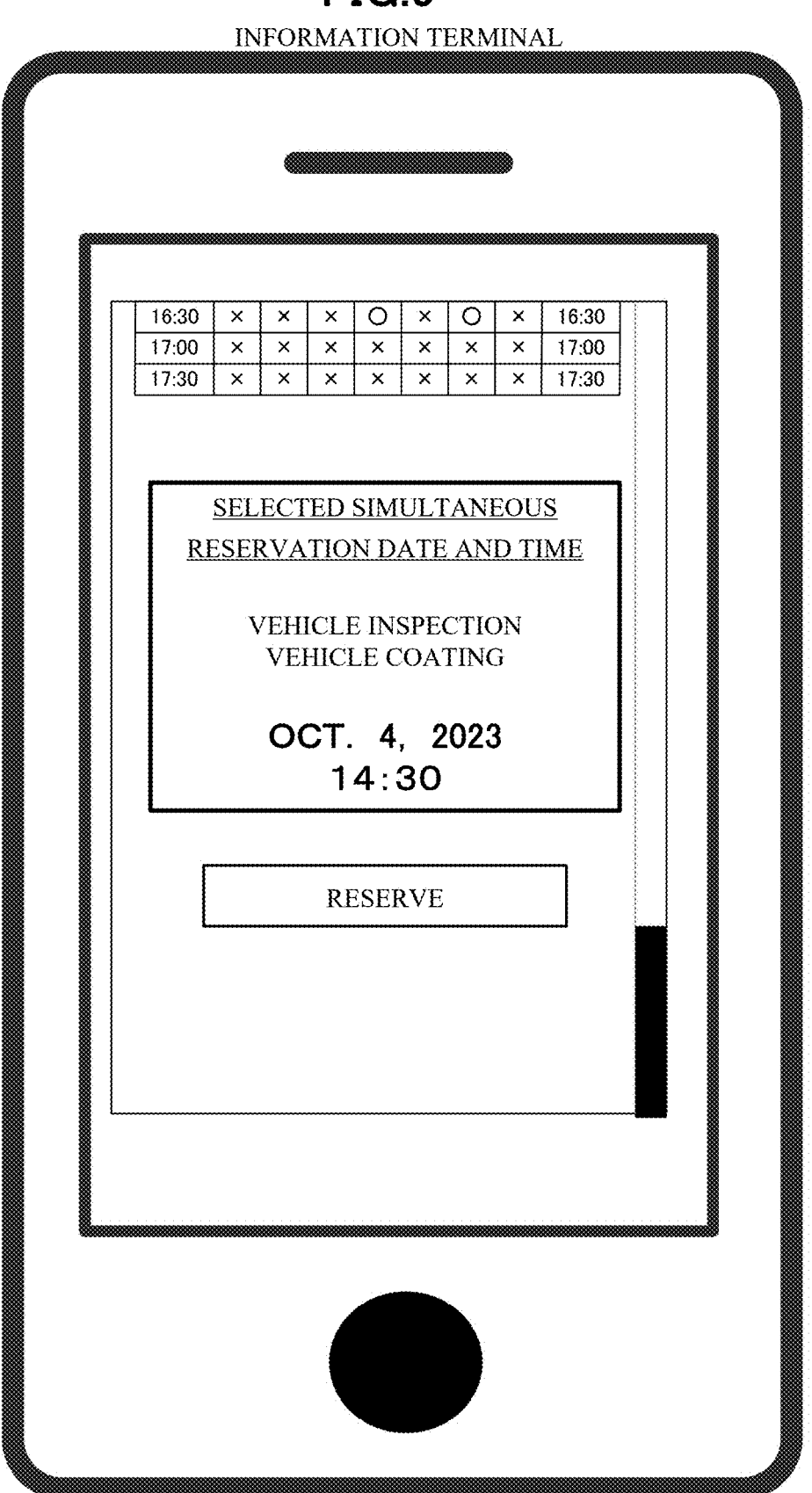
FIG. 9 is an explanatory drawing illustrating a display example of the information terminal.

After the processing of step S17 illustrated in FIG. 3 is executed, in the information terminal 100, selection of the simultaneous reservation date and time is performed on the basis of an operation by the user (step S18). Specifically, in the processing of step S18, the user performs an operation on the input/output device 130 and, as illustrated in FIG. 9, the simultaneous reservation date and time of the vehicle inspection and the vehicle coating is selected. The selected simultaneous reservation date and time is stored in the storage 110 as the selection information. That is, the selection information stored in the processing of step S14 is overwritten. Note that the selection information stored in the processing of step S18 includes the vehicle inspection reservation date and time and the vehicle coating reservation date and time. As described above, in this example, the vehicle coating is performed after the vehicle inspection, and it is assumed that two hours are required for the vehicle inspection. As such, when, for example, the simultaneous reservation date and time is 14:30, the vehicle inspection reservation date and time is set to 14:30 and the vehicle coating reservation date and time is set to 16:30, and these reservation dates and times are stored in the storage 110 as the selection information.

Figure 10:
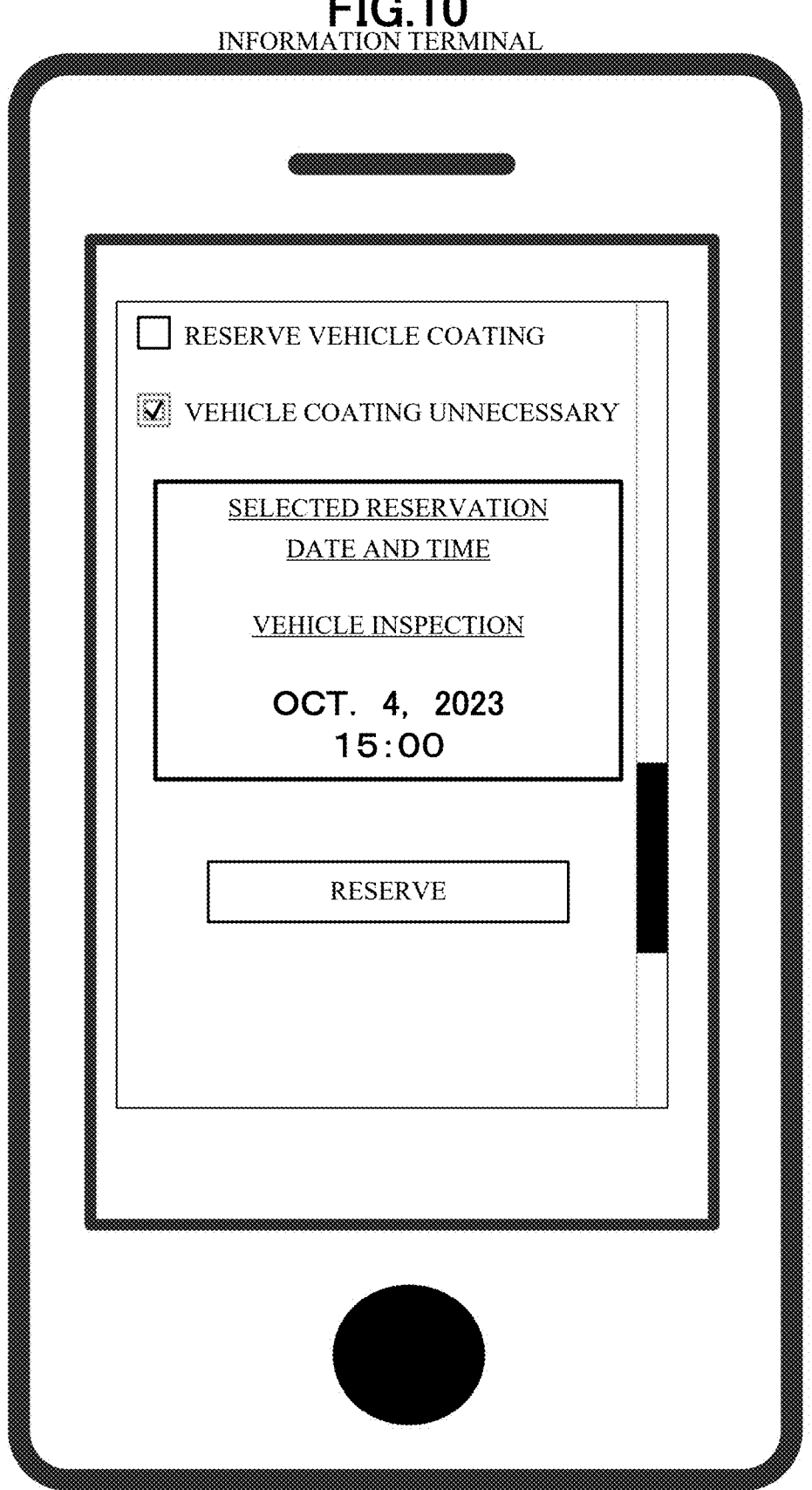
FIG. 10 is an explanatory drawing illustrating a display example of the information terminal.

Returning to FIG. 3, after the processing of step S18 is executed, or when a determination is made that the simultaneous reservation is not selected in the processing of step S15 (step S15; No), the controller 120 sends, by the functions of the reservation information registrator 125, the date and time selected by the user to the server 200 as the reservation information on the basis of an operation by the user on the input/output device 130 (step S19). Specifically, in the processing of step S19, the reservation information registrator 125 sends, to the server 200 and as the reservation information, the selection information stored as a result of being selected in the processing of step S14 or step S18, on the basis of a button "Reserve" illustrated in FIG. 9 or FIG. 10 being tapped. As a result, the information terminal 100 requests registration of the reservation date and time of the vehicle inspection and the vehicle coating included in the reservation information. Note that the example illustrated in FIG. 9 illustrates an example of a display screen for a case in which the simultaneous reservation is performed by the processing of step S18 illustrated in FIG. 3, and the example illustrated in FIG. 10 illustrates an example of a display screen for a case in which a reservation of only the vehicle inspection is performed by the processing of step S14.

Next, returning to FIG. 3, steps S20 and S21 that are executed by the server 200 are described. On the server 200 side, when the reservation information is received from the information terminal 100, the server 200 stores the reservation information in the storage 110 to register the reservation information (step S20). Specifically, in the processing of step S20, the server 200 registers the content of the received reservation information for the reservation status of the vehicle inspection and the reservation status of the vehicle coating stored in the storage 110 to update each of the reservation statuses. For example, when the simultaneous reservation is performed by the processing of step S18, in the processing of step S20, the reservation status of the vehicle inspection and the reservation status of the vehicle coating are each updated. Meanwhile, when only the processing of step S14 is performed without performing the processing of step S18, and a reservation of only the vehicle inspection is performed, only the reservation status of the vehicle inspection is updated in the processing of step S20.

After the processing of step S20 is executed, the server 200 sends the reservation results to the information terminal 100 (step S21), and ends the reservation registration processing.

When the reservation results are received on the information terminal 100 side, the information terminal 100 displays the received reservation results via the input/output device 130 (step S22), and ends the reservation processing.

The operations of the information terminal 100 and server 200 are as described above. In the related art, there are, for example, services for also reserving a rental car after reserving an airplane ticket on a travel reservation site. However, with such services, each must be reserved separately and this is time consuming to the user. To address this, according to the present embodiment, when reserving the first service it is possible to simultaneously reserve an equivalent service and, as such, the simultaneous reservation can be performed in a preferable manner.

Additionally, in the processing of step S17 of FIG. 3, the information terminal 100 of this embodiment displays the dates and times, among the dates and times that the vehicle inspection was reservable, that have changed to simultaneous reservation impossible dates and times in a mode whereby the user can visually recognize that the change has occurred. Accordingly, the user can easily visually recognize which dates and times have changed to simultaneous reservation impossible dates and times, and confusion of the user can be prevented.

Additionally, the user is not caused to simultaneously reserve the two services at the start and, also, the reservation of the second service is prompted immediately before the registration of the reservation of the first service. As such, it is possible to suitably prompt the reserver of the first service to perform a reservation of a set of services.

Additionally, in the embodiment described above, when extracting the simultaneous reservation dates and times of the vehicle inspection and the vehicle coating, the information terminal 100 extracts the simultaneous reservation dates and times on the basis of the service period of the vehicle inspection. Due to this, the information terminal 100 can appropriately extract the simultaneous reservation dates and times, and can execute the simultaneous reservation. Note that, when executing the vehicle coating first, the information terminal 100 may be configured to extract the simultaneous reservation dates and times on the basis of the period required to perform the vehicle coating.

MODIFIED EXAMPLES

The present disclosure is not limited to the embodiment described above, and various modifications and uses are possible. For example, a configuration is possible in which the information terminal 100 according to the embodiment described above does not include all of the technical features described above. For example, the information terminal 100 may include a portion of the features described above in the embodiment whereby at least one problem that exists in the related art can be solved. Additionally, at least a portion of each of the modified examples described below may be combined.

In the embodiment described above, an example is described in which two services, namely vehicle inspection and vehicle coating, are simultaneously reserved, but this is merely an example. The number of services that are simultaneously reservable is not limited to two, and may be three or more. For example, a configuration is possible in which, in the display screen illustrated in FIG. 9, a display of "Reserve a third service?" is newly performed similar to that illustrated in FIG. 6, and a new service is made simultaneously reservable in the same manner as the simultaneous reservation of the vehicle coating as the second service, When simultaneously reserving a new third service, it is sufficient that the simultaneous reservation date and time extractor 123 extracts the dates and times that all of the vehicle inspection as the first service, the vehicle coating as the second service, and the third service are reservable. It is sufficient that third date and time information that expresses dates and times that the third service is reservable is also acquired from the server 200 in the processing of step S11. The same can be applied to a case in which four or more services are simultaneously reserved. According to this configuration, it is possible to simultaneously reserve a plurality of equivalent services, and it is possible to increase convenience.

Figure 11:
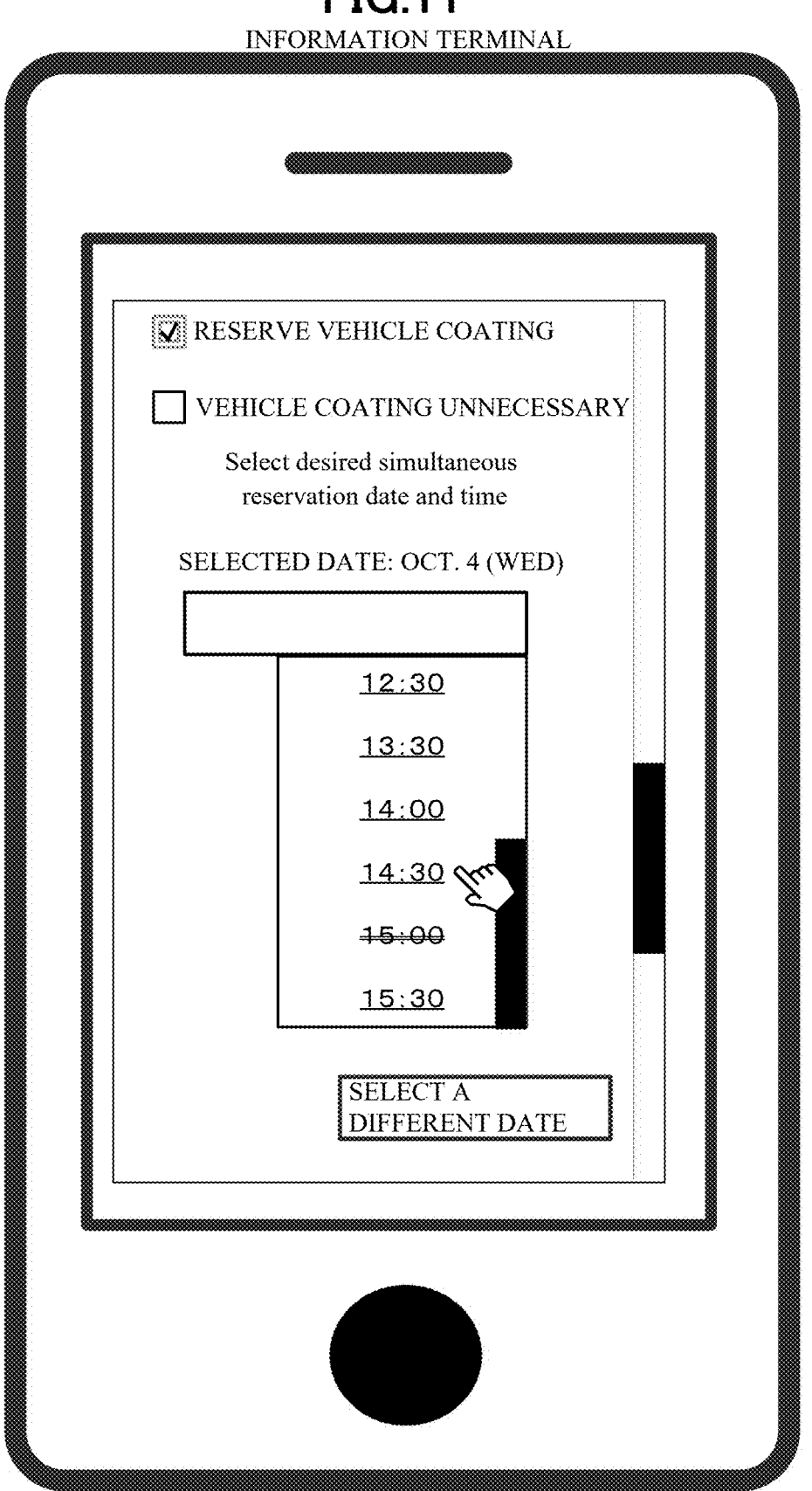
FIG. 11 is an explanatory drawing illustrating a display example of the information terminal in a modified example.
Figure 12:
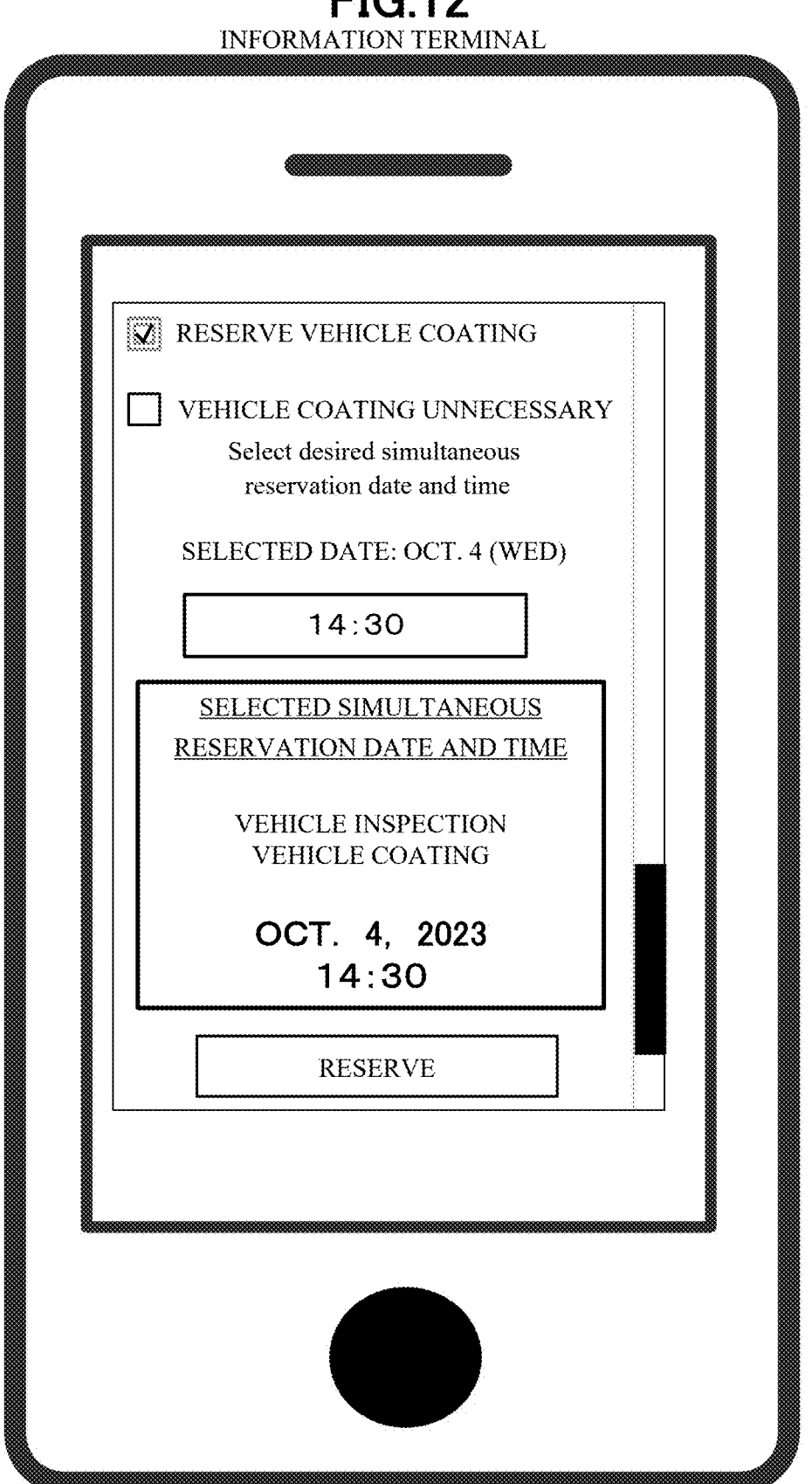
FIG. 12 is an explanatory drawing illustrating a display example of the information terminal in a modified example.

Additionally, in the embodiment described above, an example is described in which, as illustrated in FIG. 8, the simultaneously reservable dates and times extracted in the processing of step S16 of FIG. 3 are, as in the example illustrated in FIG. 4, displayed as a calendar, but this is merely an example. For example, a configuration is possible in which, as illustrated in FIGS. 11 and 12, only simultaneously reservable times on the vehicle inspection reservation date selected in the processing of step S14 of FIG. 3 are displayed, and the user is caused to select a simultaneous reservation time. According to this configuration, it is possible for the user to select a simultaneously reservable time on the desired date of the vehicle inspection without reconfirming the date, and it is possible to increase convenience. Note that, when a simultaneously reservable time does not exist on the vehicle inspection reservation date selected in the processing of step S14 of FIG. 3, it is sufficient to display in the mode of a calendar such as illustrated in FIG. 8. Additionally, as illustrated in FIG. 11, it is sufficient that the dates and times, among the dates and times that the vehicle inspection was reservable, that changed to simultaneous reservation impossible dates and times are displayed in a mode whereby the user can visually recognize that a change to the simultaneous reservation impossible dates and times has occurred. Examples thereof include displaying with a strike-through line or the like (the strike-through line of "15:00"). Additionally, as illustrated in FIG. 11, a configuration is possible in which a "Select a different date" button is displayed, and the calendar displaying illustrated in FIG. 8 is performed as a result of the user tapping the button.

In the embodiment described above, an example is described in which, as illustrated in FIGS. 4 to 9, when performing the simultaneous reservation, the display screen displayed on the input/output device 130 of the information terminal 100 is scrolled from top to bottom, and a calendar for selecting each of the reservation dates and times is displayed in order. However, this is merely an example. For example, a configuration is possible in which the calendar for selecting the vehicle inspection reservation date and time illustrated in FIG. 4 is synchronized at a point in time at which the calendar for selecting the simultaneous reservation date and time illustrated in FIG. 8 is displayed. That is, at the timing at which the calendar illustrated in FIG. 8 is displayed, the display of the calendar illustrated in FIG. 4 displayed in the upper portion of the screen may also be set as the content illustrated in FIG. 8. Moreover, a configuration is possible in which, when a date and time of either calendar is selected, the same date and time in the other calendar is selected. Due to this configuration, it is possible to prevent confusion of the user.

Furthermore, a configuration is possible in which, when the calendar illustrated in FIG. 8 is displayed, operations of the calendar display illustrated in FIG. 4 are prohibited. Additionally, a configuration is possible in which, by unchecking the simultaneous reservation check box (the check of the check box of "Also reserve vehicle coating"), operations of the calendar display illustrated in FIG. 4 are re-allowed. Due to this configuration, it is possible to prevent confusion of the user, and smoothly perform a redo of the selection. Note that a configuration is possible in which, when the calendar illustrated in FIG. 8 is displayed, operations of the calendar display illustrated in FIG. 4 are prohibited or the calendar display illustrated in FIG. 4 is deleted.

Note that the information terminal 100 and the server 200 according to the embodiment described above can be realized using a typical computer, without requiring a dedicated device. For example, the information terminal 100 that executes the processings described above can be realized by installing, on a computer, a program, for executing any of the aforementioned, from a recording medium on which the program is stored. Additionally, a configuration is possible in which one information terminal 100 and the server 200 are realized by cooperatively operating a plurality of computers.

A case is described in which the information terminal 100 of the embodiment described above extracts the simultaneous reservation date and time on the basis of the service period, but a configuration is possible in which the simultaneous reservation date and time is extracted on the basis of an empty period defined between the services.

Note that the service period or the empty period defined between the services may be set in advance, or the service period or the empty period may be set on the basis of a past reservation history. For example, a configuration is possible in which the past service period or empty period is set on the basis of an average of the empty periods between vehicle inspections and vehicle coatings simultaneously reserved in the past by the user.

Note that a case is described in which the reservable date and time acquirer 121 acquires the first date and time information 112 and the second date and time information 113 together, but a configuration is possible in which the first date and time information 112 is acquired first and, when it is selected to perform the simultaneous reservation of the vehicle inspection and the vehicle coating, the second date and time information 113 is acquired.

A case is described in which the information terminal 100 according to the embodiment described above functions as a reservation device, but a configuration is possible in which the information terminal 100 and the server 200 according to the embodiment described above function as a prediction device.

Additionally, in cases in which the functions described above are realized by being divided between an operating system (OS) and an application, or are realized by cooperation between an OS and an application, it is possible to store only the portion other than the OS on a medium.

Additionally, the programs can be piggybacked on carrier waves and distributed via a communication network. For example, the programs may be posted to a bulletin board system (BBS) on a communication network, and distributed via the network. Moreover, a configuration is possible in which the processings described above are executed by starting up these programs and, under the control of the operating system, executing the programs in the same manner as other applications/programs.

Hereinafter, various aspects of the present disclosure are recited as appendices.

Appendix 1

A reservation device comprising:
one or more processors, wherein
the one or more processors execute processing for
   acquiring first date and time information expressing a reservable date and time for a first service, and a second date and time expressing a reservable date and time for a second service,
   setting selection information including information selected based on the first date and time information,
   in a case in which, after setting the selection information, the second service is to be simultaneously reserved, extracting a simultaneously reservable date and time which is a date and time that is simultaneously reservable and which is based on the first date and time information and the second date and time information,
   in a case in which selected based on the extracted simultaneously reservable date and time, updating, based on the selection, the selection information,
   performing, based on the selection information, a reservation of a service, and
   extracting, based on a service period of one of the first service and the second service or an empty period defined between the first service and the second service, the simultaneously reservable date and time.

Appendix 2

The reservation device according to appendix 1, wherein the one or more processors execute processing for presenting, from among the extracted simultaneously reservable date and time, a time corresponding to a date set as the selection information, and causing a simultaneous reservation date and time for receiving the first service and the second service to be selected.

Appendix 3

The reservation device according to appendix 1, wherein the one or more processors execute processing for, when presenting the extracted simultaneously reservable date and time, disabling the selection information based on a presentation of the first date and time information.

Appendix 4

The reservation device according to appendix 1, wherein the one or more processors execute processing for, when presenting the extracted simultaneously reservable date and time, updating content of the presented first date and time information to content of the simultaneously reservable date and time.

Appendix 5

The reservation device according to appendix 1, wherein the one or more processors execute processing for extracting only a simultaneously reservable date and time.

Appendix 6

A reservation method to be executed by a reservation device, the method comprising:

acquiring first date and time information expressing a reservable date and time for a first service, and a second date and time expressing a reservable date and time for a second service;

setting selection information including information selected based on the first date and time information;

in a case in which, after setting the selection information, the second service is to be simultaneously reserved, extracting a simultaneously reservable date and time which is a date and time that is simultaneously reservable and which is based on the first date and time information and the second date and time information;

in a case in which selected based on the extracted simultaneously reservable date and time, updating, based on the selection, the selection information;

performing, based on the selection information, a reservation of a service; and extracting, based on a service period of one of the first service and the second service or an empty period defined between the first service and the second service, the simultaneously reservable date and time.

Appendix 7

A non-transitory computer-readable recording medium storing a program for causing a computer to execute processing of:

acquiring first date and time information expressing a reservable date and time for a first service, and a second date and time expressing a reservable date and time for a second service;

setting selection information including information selected based on the first date and time information;

in a case in which, after setting the selection information, the second service is to be simultaneously reserved, extracting a simultaneously reservable date and time which is a date and time that is simultaneously reservable and which is based on the first date and time information and the second date and time information;

in a case in which selected based on the extracted simultaneously reservable date and time, updating, based on the selection, the selection information;

performing, based on the selection information, a reservation of a service; and extracting, based on a service period of one of the first service and the second service or an empty period defined between the first service and the second service, the simultaneously reservable date and time.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

According to the present disclosure, it is possible to provide a reservation device, a reservation method, and a recording medium capable of performing simultaneous reservations in a preferable manner.

The invention claimed is:

1. A reservation device comprising:

at least one memory configured to store program code;

at least one processor configured to operate as instructed by the program code, the program being configured to cause the at least one processor to:

acquire first date and time information expressing a reservable date and time for a first service, and a second date and time expressing a reservable date and time for a second service, set selection information including information selected based on the first date and time information, in a case in which, after setting the selection information, the second service is to be simultaneously reserved, extract a simultaneously reservable date and time which is a date and time that is simultaneously reservable and which is based on the first date and time information and the second date and time information, in a case in which a simultaneous reservation is selected based on the extracted simultaneously reservable date and time, update, based on the selection, the selection information, perform, based on the selection information, a reservation of a service, extract, based on a service period of one of the first service and the second service or an empty period defined between the first service and the second service, the simultaneously reservable date and time;

display the extracted simultaneously reservable date and time;

display the dates and times, among the dates and times that the first service was reservable, that have changed to simultaneous reservation impossible dates and times in a mode such that a user can visually recognize that a change has occurred;

display and synchronize a first calendar for selecting the first service reservation date and time with a second calendar for selecting the simultaneous reservation date and time such that when a date and time of either calendar is selected, the same date and time in the other calendar is selected; and display available dates and times in a calendar mode when a simultaneously reservable time does not exist on the first service reservation date selected in the selection information.

2. The reservation device according to claim 1, wherein the program is configured to cause at least one of the at least one processor to present, from among the extracted simultaneously reservable date and time, a time corresponding to a date set as the selection information, and cause a simultaneous reservation date and time for receiving the first service and the second service to be selected.

3. The reservation device according to claim 1, wherein the program is configured to cause at least one of the at least one processor to, when presenting the extracted simultaneously reservable date and time, disable the selection information based on a presentation of the first date and time information.

4. The reservation device according to claim 1, wherein the program is configured to cause at least one of the at least one processor to, when presenting the extracted simultaneously reservable date and time, update content of the presented first date and time information to content of the simultaneously reservable date and time.

5. The reservation device according to claim 1, wherein the program is configured to cause at least one of the at least one processor to extract only a simultaneously reservable date and time.

6. A non-transitory computer-readable recording medium for storing a program that when executed by at least one processor, causes the at least one processor to:

acquire first date and time information expressing a reservable date and time for a first service, and a second date and time expressing a reservable date and time for a second service;

set selection information including information selected based on the first date and time information;

in a case in which, after setting the selection information, the second service is to be simultaneously reserved, extract a simultaneously reservable date and time which is a date and time that is simultaneously reservable and which is based on the first date and time information and the second date and time information;

in a case in which a simultaneous reservation is selected based on the extracted simultaneously reservable date and time, update, based on the selection, the selection information;

perform, based on the selection information, a reservation of a service;

extract, based on a service period of one of the first service and the second service or an empty period defined between the first service and the second service, the simultaneously reservable date and time;

display the extracted simultaneously reservable date and time;

display the dates and times, among the dates and times that the first service was reservable, that have changed to simultaneous reservation impossible dates and times in a mode such that a user can visually recognize that a change has occurred;

display and synchronize a first calendar for selecting the first service reservation date and time with a second calendar for selecting the simultaneous reservation date and time such that when a date and time of either calendar is selected, the same date and time in the other calendar is selected; and display available dates and times in a calendar mode when a simultaneously reservable time does not exist on the first service reservation date selected in the selection information.

\* \* \* \* \*